(12) United States Patent
Kirkman

(10) Patent No.: US 8,549,884 B2
(45) Date of Patent: Oct. 8, 2013

(54) BOTTOM PLATE LIFT MECHANISM FOR A GLASSWARE FORMING MACHINE

(75) Inventor: Thomas R. Kirkman, Napoleon, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 1514 days.

(21) Appl. No.: 11/998,241

(22) Filed: Nov. 29, 2007

(65) Prior Publication Data

US 2009/0139267 A1    Jun. 4, 2009

(51) Int. Cl.
 *C03B 9/38* (2006.01)
(52) U.S. Cl.
 CPC ............... *C03B 9/38* (2013.01); *C03B 9/3891* (2013.01)
 USPC .......................................................... 65/355
(58) Field of Classification Search
 USPC .......................................................... 65/355
 See application file for complete search history.

(56) References Cited

U.S. PATENT DOCUMENTS

| | | |
|---|---|---|
| 531,609 A | 12/1894 | Blue |
| 3,175,895 A | 3/1965 | Zappia |
| 4,492,595 A | 1/1985 | Nebelung et al. |
| 4,579,576 A | 4/1986 | Jones |
| 4,586,944 A | 5/1986 | Romberg |
| 4,701,202 A | 10/1987 | Foster |
| 5,718,740 A | 2/1998 | Mann |
| 6,123,096 A | 9/2000 | Kammonen |
| 2003/0196457 A1 | 10/2003 | Morin et al. |
| 2004/0216491 A1 | 11/2004 | Sasso et al. |
| 2005/0235697 A1* | 10/2005 | Tijerina-Ramos et al. ....... 65/68 |
| 2006/0162383 A1 | 7/2006 | Tijerina-Ramos et al. |
| 2006/0174656 A1 | 8/2006 | Flynn |

FOREIGN PATENT DOCUMENTS

| | | |
|---|---|---|
| BE | 551751 A | 12/1959 |
| GB | 2347420 A | 9/2000 |

* cited by examiner

*Primary Examiner* — Matthew Daniels
*Assistant Examiner* — Cynthia Szewczyk

(57) ABSTRACT

A bottom plate lift mechanism for a glassware forming machine includes a bottom plate assembly having at least one bottom plate on a base with a passage for feeding cooling air to the bottom plate. The bottom plate assembly is mounted on a housing that has a cooling air chamber for directing cooling wind to the bottom plate assembly. A lift mechanism is operatively coupled to the housing for selectively raising and lowering the housing and the bottom plate assembly mounted on the housing. The housing has an opening to the cooling air chamber for receiving a cooling air control cartridge to control passage of cooling wind through the chamber to the bottom plate assembly. A plurality of control cartridges are interchangeably insertable through the opening into the chamber for selectively controlling passage of cooling air to the bottom plate assembly in different cooling modes of operation associated with the cartridges.

13 Claims, 5 Drawing Sheets

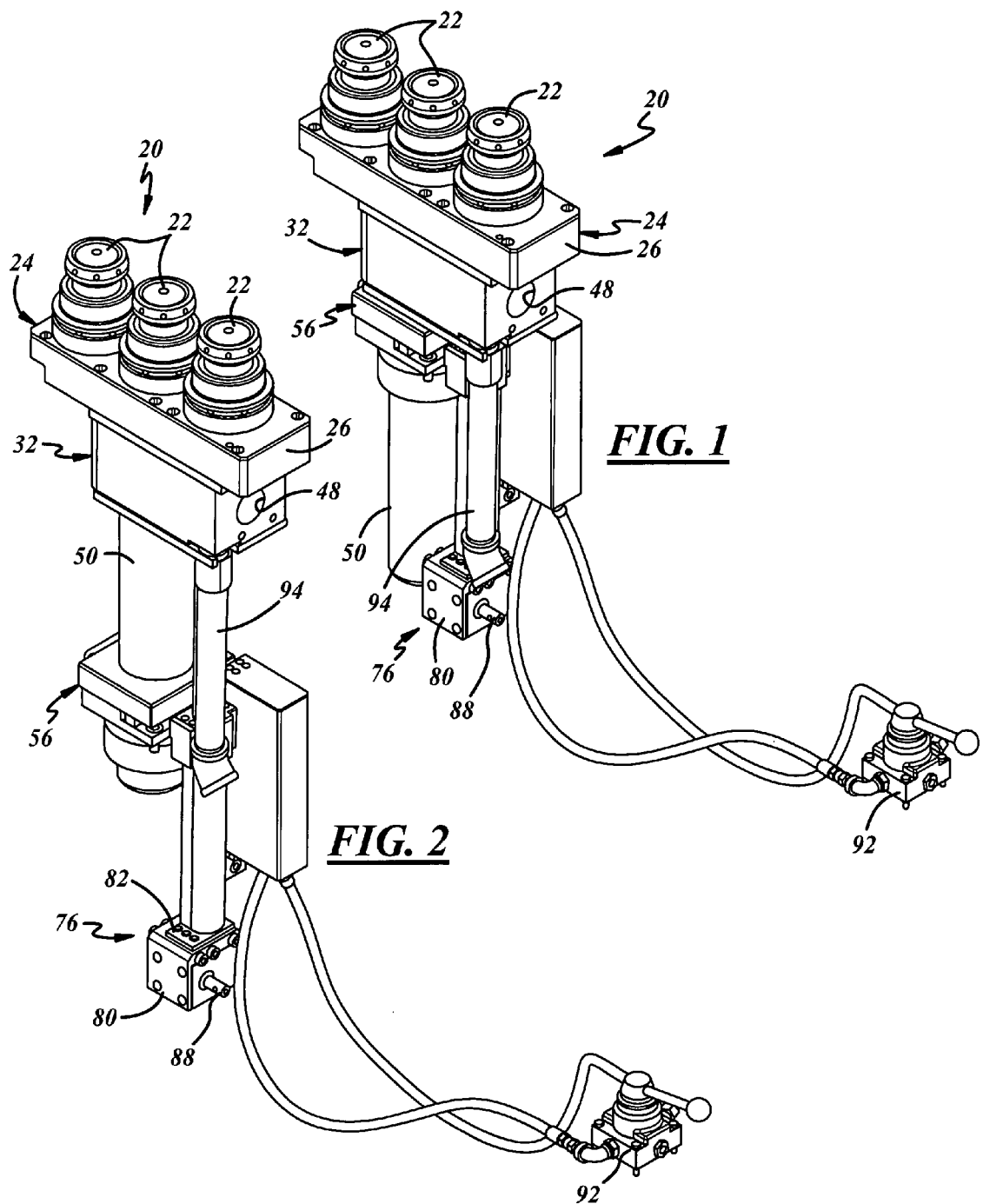

BOTTOM PLATE LIFT MECHANISM FOR A GLASSWARE FORMING MACHINE

The present disclosure relates to a bottom plate mechanism for a glassware forming machine, and more particularly to a mechanism for selectively raising and lowering the bottom plate(s) and feeding cooling air to the bottom plate(s).

BACKGROUND AND SUMMARY OF THE DISCLOSURE

A blow mold system in a typical glassware forming machine includes at least one pair of mold halves that are brought together around a bottom plate to form a blow mold cavity. The bottom plate typically includes a central air passage for receiving cooling air to cool the portion of the bottom plate against which the glass is blown, and may also include one or more vacuum passages for feeding vacuum to the blow mold halves to help draw the glass against the mold surfaces during the blowing operation. The bottom plate is mounted on a base that has a passage for feeding cooling air to the bottom plate, and which may also have a vacuum passage for feeding vacuum to the bottom plate. The bottom plate and base are mounted on a lift mechanism for selectively raising the bottom plate into operative position for engagement by the blow mold halves, and for lowering the bottom plate beneath the level of the blow mold halves for maintenance, repair or replacement of the bottom plate and/or the blow mold halves. The present disclosure is directed to improvements in the bottom plate assembly mounting and lift arrangement that facilitate direction of cooling air to the bottom plate assembly in various cooling modes of operation and/or that facilitate raising and lowering of the bottom plate assembly, and/or that reliably clamp the bottom plate assembly in the raised position.

The present disclosure embodies a number of aspects that can be implemented separately from or in combination with each other.

A bottom plate lift mechanism for a glassware forming machine, in accordance with one aspect of the present disclosure, includes a bottom plate assembly having at least one bottom plate on a base with a passage for feeding cooling air to the bottom plate. The bottom plate assembly is mounted on a housing that has a cooling air chamber for directing cooling wind to the bottom plate assembly. A lift mechanism is operatively coupled to the housing for selectively raising and lowering the housing and the bottom plate assembly mounted on the housing. The housing has an opening to the cooling air chamber for receiving a cooling air control cartridge to control passage of cooling wind through the chamber to the bottom plate assembly. A plurality of control cartridges are interchangeably insertable through the opening into the chamber for selectively controlling passage of cooling air to the bottom plate assembly in different cooling modes of operation associated with the cartridges.

The cooling air chamber preferably includes a passage through the housing, and the opening in the housing opens into the passage for selective placement of the cartridge into the passage. The cooling air cartridge may comprise a damper cartridge with a damper for adjustably blocking the air passage to regulate the flow of cooling wind to the bottom plate assembly, such as by manual adjustment or adjustment by means of a pneumatic valve. The cartridge alternatively may be a compressed air cooling cartridge with a damper sleeve for blocking the air passage through the housing and a fitting for connection to a source of compressed air to supply compressed cooling air to the bottom plate assembly instead of cooling wind received through the cooling air chamber in the housing.

A hollow support tube preferably extends from the housing for feeding cooling wind to the housing through the hollow interior of the tube. The lift mechanism preferably includes a base with a clamp for selective external engagement with the hollow support tube to hold the tube and the housing in a raised position. The lift mechanism preferably also includes a lifting screw disposed on the base, a lifting nut operatively coupled to the lifting screw, and facility for selectively rotating the lifting screw and thereby raising and lowering the lifting nut and the housing. The bottom plate assembly may include a passage for feeding vacuum to the bottom plate, and the bottom plate mechanism may include a conduit for feeding vacuum to the bottom plate assembly through the housing separately from the lift mechanism.

BRIEF DESCRIPTION OF THE DRAWINGS

The disclosure, together with additional objects, features, advantages and aspects thereof, will best be understood from the following description, the appended claims and the accompanying drawings, in which:

FIG. 1 is a perspective view of a bottom plate lift mechanism in accordance with an exemplary embodiment of the present disclosure with the bottom plates in a fully lowered position;

FIG. 2 is a perspective view of the bottom plate lift mechanism of FIG. 1 with the bottom plates in a raised position;

DETAILED DESCRIPTION OF PREFERRED EMBODIMENTS

Figure 6:
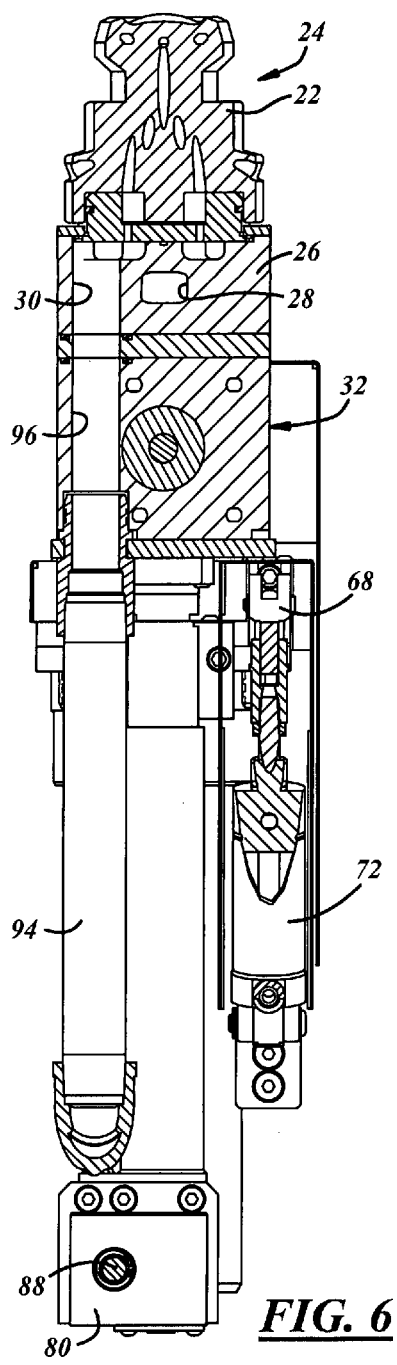
FIG. 6 is a sectional view taken substantially along the line 6-6 in FIG. 4.

FIGS. 1-2 illustrate a bottom plate lift mechanism 20 in accordance with an exemplary embodiment of the present disclosure as including a bottom plate assembly 24 having three bottom plates 22 mounted on a base 26. Base 26 includes a passage 28 (FIG. 6) for feeding cooling air to bottom plates 22. Base 28 preferably (but not necessarily) also includes a passage 30 for feeding vacuum to bottom plates 22. Bottom plate assembly 24 may be of the type disclosed in U.S. application Ser. No. 11/818,363, the disclosure of which is incorporated herein by reference for purposes of background. Other types of bottom plate assemblies also can be employed.

Figure 3:
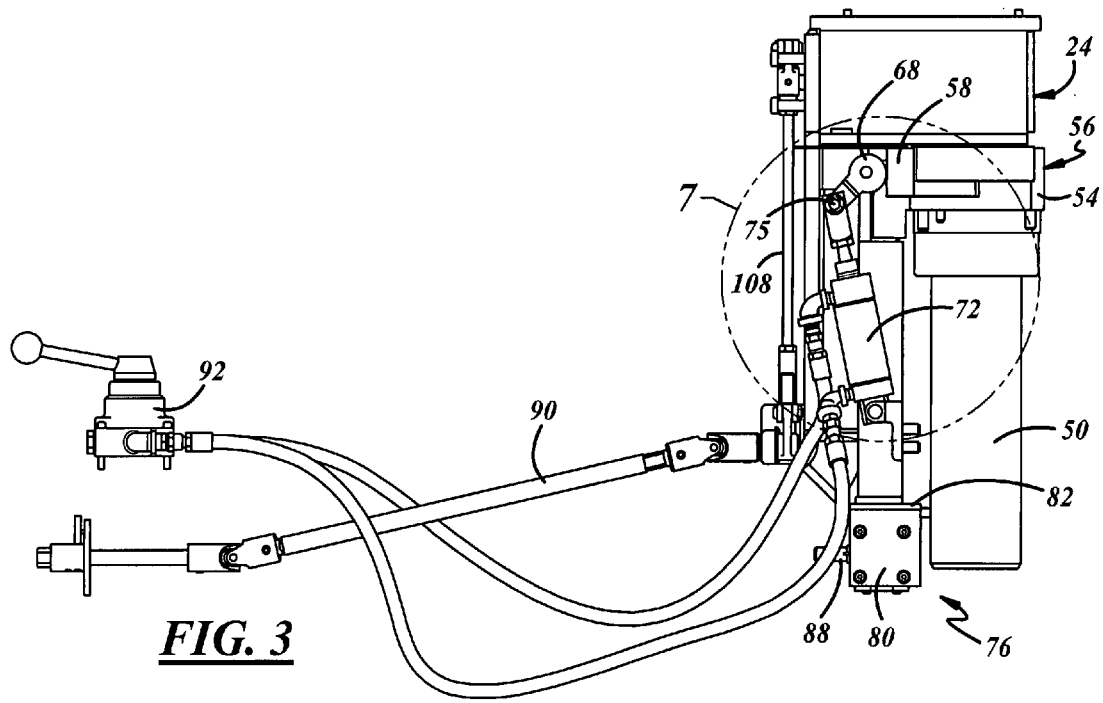
FIG. 3 is a side elevational view of the bottom plate lift mechanism of FIG. 1 with the bottom plate assembly removed.
Figure 4:
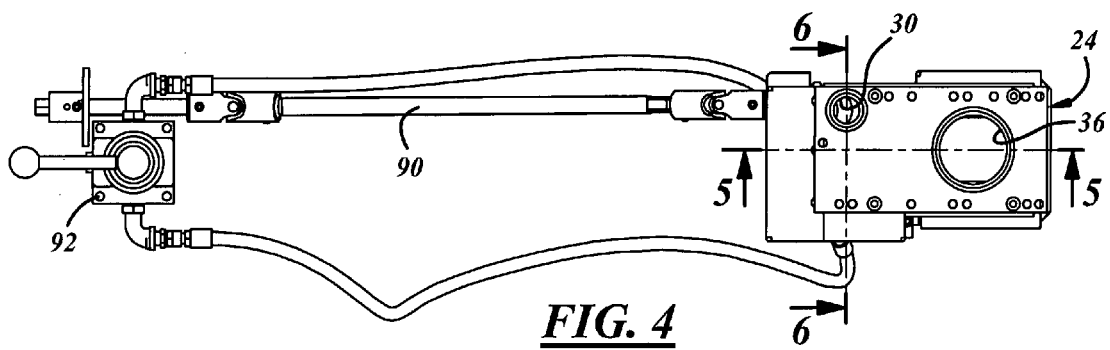
FIG. 4 is a top plan view of the bottom plate lift mechanism of FIG. 3.
Figure 5:
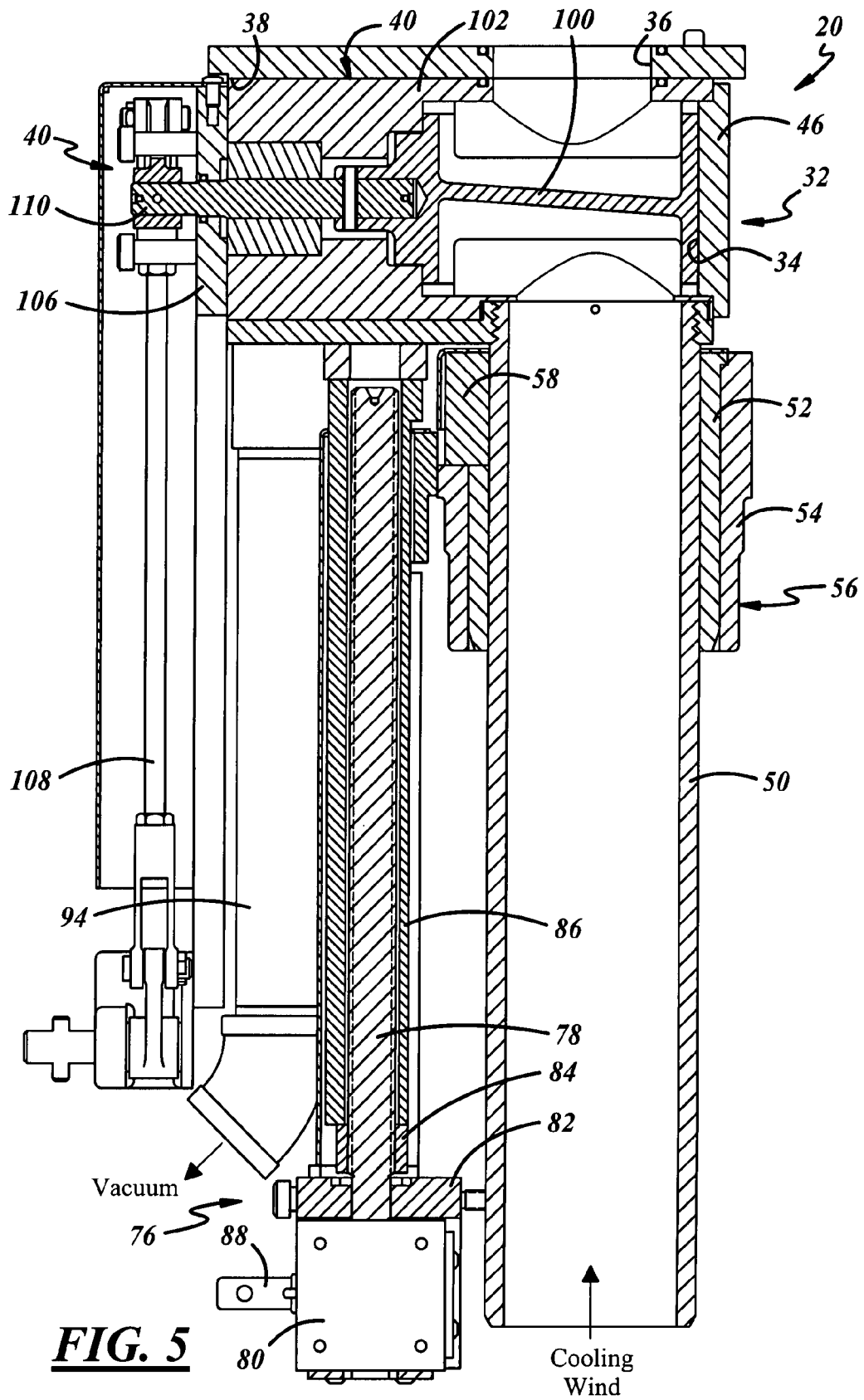
FIG. 5 is a sectional view taken substantially along the line 5-5 in FIG. 4.

Bottom plate assembly 24 is mounted on a housing 32. Housing 32 preferably includes a cooling air chamber 34 (FIG. 5) for directing cooling air through an outlet 36 to a cooling air inlet of bottom plate assembly base 26. Housing 32 has a side opening 38 that opens to chamber 34 for selective insertion of one of a plurality of cartridges 40, 42, 44 (FIGS. 5 and 9-11) for controlling flow of cooling air to the bottom plate assembly in various alternative cooling modes of operation associated with the cartridges. FIGS. 1-2 illustrate bottom plate lift mechanism 20 prior to assembly of a cooling air lift control cartridge to the mechanism. FIGS. 3-5 illustrate bottom plate lift mechanism 20 with cooling air control cartridge 40 assembled to the mechanism by insertion through opening 38. A cover plate 46 covers the opening 48 in housing 32 opposite from cartridge-receiving opening 38. The cooling air control cartridges will be discussed in greater detail hereinafter.

A hollow vertical support tube 50 is affixed to and depends from housing 32, preferably in alignment with the lower opening to cooling air chamber 34 in housing 32. In the illustrated embodiment, the upper end of support tube 50 is threaded into an opening in housing 32. The hollow interior of support tube 50 opens to the lower end of cooling air chamber 34, and cooling wind fed to the lower end of tube 50 thus is directed into cooling air chamber 34. (The term "cooling wind" has its usual meaning in the art, referring to flow of cooling air at relatively high volume and low pressure, such as from the pressurized interior of a machine section box. Compressed air cooling, on the other hand typically would employ airflow at higher pressure and directed to a specific component.

Figure 7:
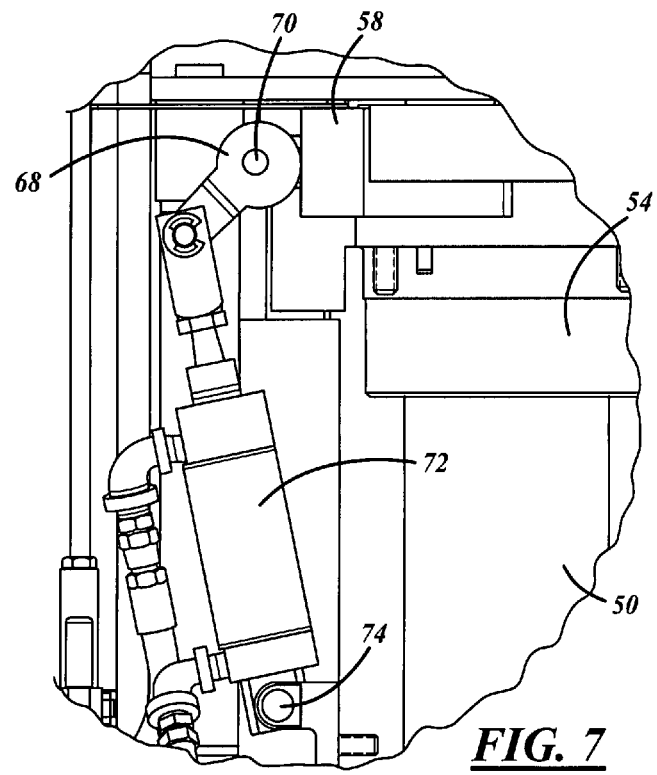
FIG. 7 is an elevational view on an enlarged scale of the portion of FIG. 3 within the area 7.
Figure 8:
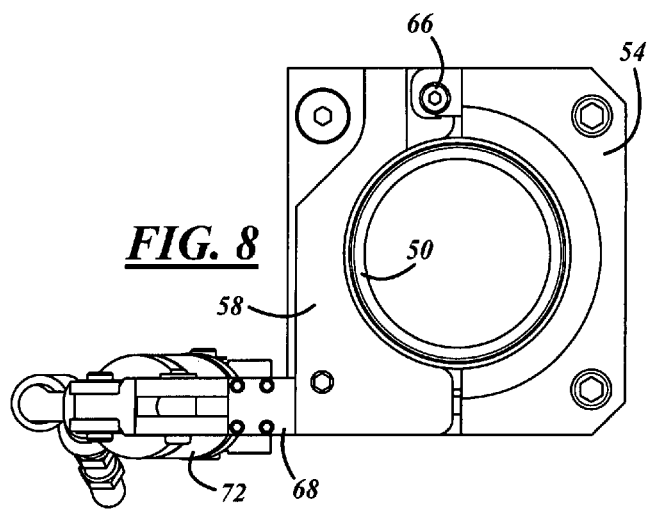
FIG. 8 is a top plan view of the clamp mechanism in the exemplary bottom plate lift mechanism of FIGS. 1-7.

Support tube 50 extends through a guide bushing 52 in a tube mount 54 carried by a bottom plate lift mechanism base 56. Base 56 is adapted to be mounted in fixed position on a glassware forming machine support frame. A clamp arm 58 (FIGS. 5, 7 and 8) is carried by base 56 and pivots around the axis of a mounting screw 66 toward and away from tube 50 to externally engage the tube and clamp the tube against an opposing portion of tube mount 54. A clamp cam 68 is pivotal around a pin 70 with an eccentric periphery engaged with clamp arm 58 at a position spaced from the pivot axis of the clamp arm. Cam 68 is coupled to an actuator 72, preferably a linear actuator and most preferably a linear pneumatic actuator, that is pivoted at 74 to base 56 and at 75 to actuator 72. The eccentric outer surface of cam 68 engages the outer surface of clamp arm 58 so that, when actuator 72 is actuated and cam 68 is rotated counterclockwise from the position illustrated in FIGS. 7 and 8, clamp arm 58 moves inwardly to clamp tube 58 firmly against the opposing portion of tube mount 54 and thereby hold tube 50 and bottom plate mechanism housing 32 in adjusted lifted position.

Housing 32 and bottom plate assembly 24 carried by housing 32 are lifted and lowered by a lift mechanism 76 best seen in FIGS. 1-2 and 5. A lifting screw 78 extends upwardly from a gearbox 80 that is carried by a bracket 82 secured to base 56. A lifting nut 84 is threadably coupled to lifting screw 78. A lifting tube 86 rests at its lower end on nut 84 and is suspended at its upper end from housing 32. In the illustrated exemplary embodiment of the disclosure, a shaft 88 extends from gearbox 80 and is coupled to a manual crank mechanism 90 (FIGS. 3-4) for selectively raising and lowering the bottom plate assembly. Gearbox 80 and/or manual crank mechanism 90 could be replaced by a suitable rotary actuator. FIGS. 1-4 also illustrate a manual valve 92 connected by suitable conduits to actuator 76 of the clamp mechanism for engaging lift tube 50 and thereby hold the bottom plate mechanism in the desired raised position.

In bottom plate systems that feed vacuum to the bottom plates as previously described, a conduit 94 can be suspended from housing 32 for connection to a vacuum source. Vacuum is fed from conduit 94 through a passage 96 (FIG. 6) in housing 32 to passage 30 in bottom plate assembly base 26. Vacuum thus is fed to bottom plate assembly 24 separately from cooling air. In applications in which vacuum is not supplied to the bottom plates, conduit 94 may be eliminated.

Figure 9:
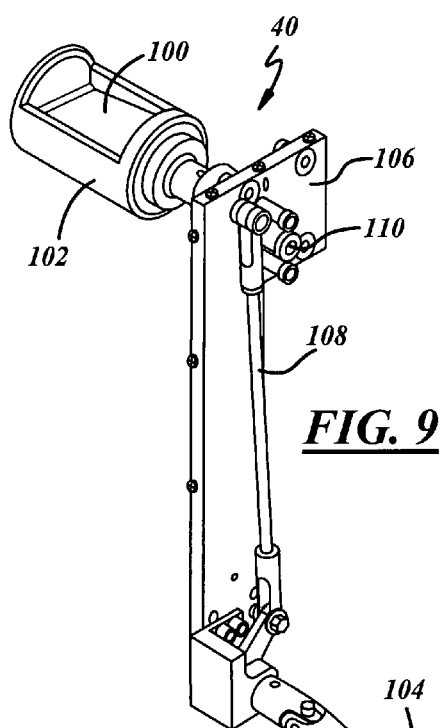
FIGS. 9-11 are perspective views of cooling wind control cartridges usable in the exemplary bottom plate lift mechanism of FIGS. 1-8.

FIGS. 5 and 9 illustrate cooling wind damper cartridge 40 as including a damper 100 rotatably mounted within a sleeve 102 that is slidably receivable through opening 38 in housing 32, as shown in FIG. 5, to place damper 100 within cooling air chamber 34 for adjustably blocking flow of cooling wind from tube 50 through chamber 34. Damper 100 is rotatably adjustable within sleeve 102 by means of a hand crank mechanism 104 that is suspended from a plate 106 mountable over housing opening 38 both to mount the cartridge in the housing and to close opening 38. Hand crank 104 is coupled by an arm 108 and a crank to a shaft 110 extending from damper 100 for rotating damper 100 within sleeve 102 around the axis of shaft 110.

Figure 10:
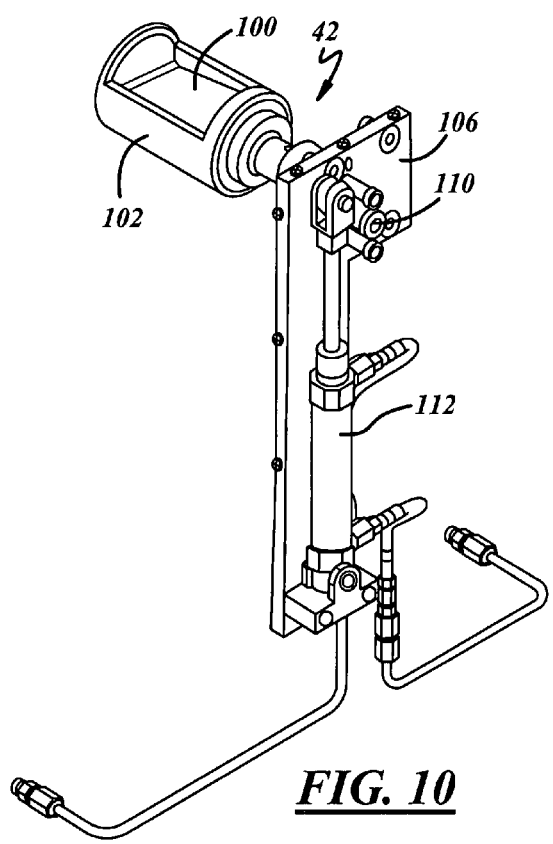

FIG. 10 illustrates a cooling wind cartridge 42 that is operated by a pneumatic valve 112 instead of a hand crank 104 (FIG. 9). The elements of pneumatically operated cartridge 42 otherwise are similar to those of hand-operated cartridge 40, and are indicated by correspondingly identical reference numerals. Hand crank 104 can be replaced by a suitable rotary actuator.

Figure 11:
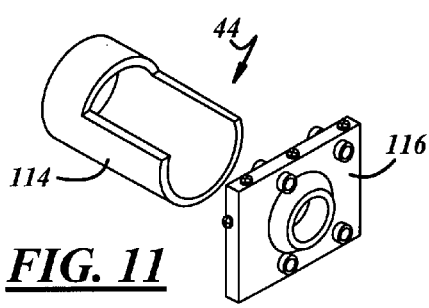

FIG. 11 illustrates a compressed air cooling air cartridge 44 as including a sleeve 114 that, when inserted into opening 38 of housing 32 (FIG. 5), blocks flow of cooling wind from tube 50. Cartridge 44 also includes a fitting plate 116 that is mountable to housing 32 for connection to a compressed air line and thereby feeding compressed air to housing chamber 34 and to bottom plate assembly 24 mounted on the housing. Thus, the compressed air cartridge 44 substitutes compressed air cooling for high volume cooling wind.

There thus has been disclosed a bottom plate lift mechanism for a glassware forming machine that fully satisfies all of the objects and aims previously set forth. The bottom plate mechanism has been disclosed in conjunction with an exemplary embodiment, and various modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A bottom plate lift mechanism for a glassware forming machine, which includes:
    a bottom plate assembly having at least one bottom plate on a base with a passage for feeding cooling air to said bottom plate,
    a housing on which said bottom plate assembly is mounted, said housing having a cooling air chamber and means for directing cooling wind into said chamber,
    a lift mechanism operatively coupled to said housing for selectively raising and lowering said housing and said bottom plate assembly,
    said housing having an opening to said cooling air chamber for receiving a cooling air control cartridge to control passage of cooling wind through said chamber to said bottom plate assembly, and
    a plurality of cooling cartridges for interchangeable insertion through said opening into said chamber for selectively controlling passage of cooling air to said bottom plate assembly in different cooling modes of operation associated with said cartridges.

2. The bottom plate lift mechanism set forth in claim 1 wherein said means includes a hollow tube extending from said housing, and wherein said lift mechanism includes a base with a clamp for selectively externally engaging said hollow tube for holding said tube and said housing in a raised position.

3. The bottom plate lift mechanism set forth in claim 2 wherein said clamp includes a hinged clamp member carried by said base, a cam and means for actuating said cam to move said hinged clamp member into external clamping engagement with said tube.

4. The bottom plate lift mechanism set forth in claim 3 wherein said cam is pivotally mounted on said base and said means for actuating said cam comprise a linear actuator pivotally mounted on said base and coupled to said cam.

5. The bottom plate lift mechanism set forth in claim 1 wherein said lift mechanism includes a lifting screw disposed on said base, a lifting nut operatively coupled to said lifting screw, and means for rotating said lifting screw to raise and lower said lifting nut and said housing.

6. The bottom plate lift mechanism set forth in claim 5 including a tube extending from said housing surrounding said lifting tube and in engagement with said lifting nut.

7. The bottom plate lift mechanism set forth in claim 6 wherein said bottom plate assembly includes a passage for feeding vacuum to said at least one bottom plate, and wherein said bottom plate lift mechanism includes a conduit coupled to said housing for feeding vacuum to said bottom plate assembly through said housing separately from said lift mechanism.

8. The bottom plate lift mechanism set forth in claim 1 wherein said cooling air chamber includes a passage through said housing, and wherein said opening opens into said passage for selective placement of said cartridges into said passage.

9. The bottom plate lift mechanism set forth in claim 8 wherein said plurality of control cartridges includes a damper cartridge with a damper for adjustably blocking air passage and means for adjustably positioning said damper in said passage.

10. The bottom plate lift mechanism set forth in claim 9 wherein said cartridge includes a sleeve adapted for insertion into said housing, said damper being rotatable within said sleeve.

11. The bottom plate lift mechanism set forth in claim 10 wherein said means for adjustably positioning said damper includes a manual adjustment member.

12. The bottom plate lift mechanism set forth in claim 11 wherein said means for adjustably positioning said damper includes a pneumatic valve coupled to said damper.

13. The bottom plate lift mechanism set forth in claim 8 wherein said cartridges include a compressed air cooling cartridge with a damper sleeve for insertion through said opening to block said means for directing cooling wind into said chamber, and a fitting for connection to a source of compressed air for directing compressed cooling air through said housing into said bottom plate assembly.

\* \* \* \* \*